US008598990B2

(12) United States Patent
Schuessler

(10) Patent No.: US 8,598,990 B2
(45) Date of Patent: Dec. 3, 2013

(54) DELIMITED READ COMMAND FOR EFFICIENT DATA ACCESS FROM RADIO FREQUENCY IDENTIFICATION (RFID) TAGS

(75) Inventor: Frederick Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1253 days.

(21) Appl. No.: 12/165,509

(22) Filed: Jun. 30, 2008

(65) Prior Publication Data

US 2009/0322482 A1 Dec. 31, 2009

(51) Int. Cl.
*H04Q 5/22* (2006.01)

(52) U.S. Cl.
USPC ...................................... 340/10.3; 340/13.26

(58) Field of Classification Search
USPC ............. 711/154, 117; 340/10.1–10.5, 13.26; 395/114
See application file for complete search history.

(56) References Cited

U.S. PATENT DOCUMENTS

| | | | | |
|---|---|---|---|---|
| 5,040,175 A * | 8/1991 | Tuch et al. | ..................... | 370/245 |
| 5,222,224 A * | 6/1993 | Flynn et al. | ..................... | 711/144 |
| 5,818,348 A * | 10/1998 | Walczak et al. | ............. | 340/10.3 |
| 5,963,716 A * | 10/1999 | Welborn et al. | .............. | 358/1.15 |
| 5,966,082 A * | 10/1999 | Cofino et al. | ............. | 340/10.51 |
| 6,064,965 A * | 5/2000 | Hanson | .......................... | 704/275 |
| 6,092,193 A * | 7/2000 | Loomis et al. | ................. | 713/193 |
| 6,122,657 A * | 9/2000 | Hoffman et al. | .............. | 709/201 |
| 6,172,596 B1 * | 1/2001 | Cesar et al. | ................ | 340/10.41 |
| 6,205,511 B1 * | 3/2001 | Wen | .................................. | 711/5 |
| 6,223,248 B1 * | 4/2001 | Bosshart | ....................... | 711/105 |
| 6,223,260 B1 * | 4/2001 | Gujral et al. | .................... | 711/145 |
| 6,340,932 B1 * | 1/2002 | Rodgers et al. | ............ | 340/572.7 |
| 6,422,476 B1 * | 7/2002 | Ackley | ........................... | 235/494 |
| 6,480,100 B1 * | 11/2002 | Frieden et al. | ................ | 340/10.1 |
| 6,480,937 B1 * | 11/2002 | Vorbach et al. | ............... | 711/122 |
| 6,674,596 B1 * | 1/2004 | Takayama | ....................... | 360/69 |
| 6,677,852 B1 * | 1/2004 | Landt | ........................... | 340/10.1 |
| 6,891,976 B2 * | 5/2005 | Zheltov et al. | ................ | 382/246 |
| 6,980,087 B2 * | 12/2005 | Zukowski | ................... | 340/10.51 |
| 7,246,751 B2 * | 7/2007 | Diorio et al. | ................... | 235/492 |
| 7,528,744 B2 * | 5/2009 | Ryan et al. | ...................... | 341/50 |
| 7,613,887 B1 * | 11/2009 | Wong et al. | .................... | 711/154 |
| 7,764,163 B2 * | 7/2010 | Miller | .......................... | 340/10.1 |
| 7,777,609 B2 * | 8/2010 | Kuramoto | .................... | 340/10.1 |
| 7,949,838 B1 * | 5/2011 | Wong et al. | ................... | 711/154 |
| 7,961,097 B2 * | 6/2011 | Porte et al. | .................. | 340/572.1 |
| 8,028,149 B2 * | 9/2011 | Moreaux et al. | .............. | 711/219 |
| 8,120,463 B2 * | 2/2012 | Graichen et al. | ............. | 340/10.1 |
| 2002/0103552 A1 * | 8/2002 | Boucher et al. | .................. | 700/94 |

(Continued)

*Primary Examiner* — Jennifer Mehmood
*Assistant Examiner* — Rufus Point
(74) *Attorney, Agent, or Firm* — Bartholomew J. DiVita; Terri H. Smith; Kenneth A. Haas

(57) ABSTRACT

Methods, and systems for efficiently reading data stored in an RFID tag memory are described. A delimited read command is issued by an RFID reader, causing a tag to truncate the data read-out process when a delimiter data pattern is detected in the stored data. Upon receipt of a delimited read command, a tag reads data until a delimiter pattern is detected. The tag determines whether the detected pattern is a valid delimiter pattern or a spurious one. If the detected pattern is a valid delimiter, the tag terminates the read process and transmits the data to the reader. The format of the delimiter pattern may be modified based on needs of a particular communications protocol or specific implementations.

20 Claims, 8 Drawing Sheets

(56) References Cited

U.S. PATENT DOCUMENTS

| | | |
|---|---|---|
| 2002/0118097 A1* | 8/2002 | Heinrich et al. ............ 340/10.32 |
| 2004/0196143 A1* | 10/2004 | Crump et al. ................ 340/10.1 |
| 2005/0200458 A1* | 9/2005 | Friedman .................... 340/10.4 |
| 2005/0270855 A1* | 12/2005 | Earhart et al. ............ 365/189.05 |
| 2006/0187031 A1* | 8/2006 | Moretti et al. ........... 340/539.22 |
| 2007/0075128 A1* | 4/2007 | Hall et al. .................... 235/376 |
| 2007/0188305 A1* | 8/2007 | Drucker ...................... 340/10.4 |
| 2007/0258377 A1* | 11/2007 | Jantunen et al. ............. 370/241 |
| 2008/0000981 A1* | 1/2008 | Niwa et al. .............. 235/462.01 |
| 2008/0018431 A1* | 1/2008 | Turner et al. ................. 340/10.2 |
| 2008/0057913 A1* | 3/2008 | Sinha et al. ................ 455/414.1 |
| 2008/0106387 A1* | 5/2008 | Miller .......................... 340/10.5 |
| 2008/0165003 A1* | 7/2008 | Graichen et al. ........... 340/572.1 |
| 2008/0205558 A1* | 8/2008 | Arnitz ........................... 375/340 |
| 2008/0244335 A1* | 10/2008 | Coon et al. ...................... 714/54 |
| 2008/0272888 A1* | 11/2008 | Cardwell et al. ............ 340/10.1 |
| 2008/0284570 A1* | 11/2008 | Ryoo et al. .................. 340/10.1 |
| 2008/0290993 A1* | 11/2008 | Ryoo et al. .................. 340/10.1 |
| 2009/0184802 A1* | 7/2009 | Park ............................. 340/10.1 |
| 2009/0322482 A1* | 12/2009 | Schuessler .................. 340/10.1 |

* cited by examiner

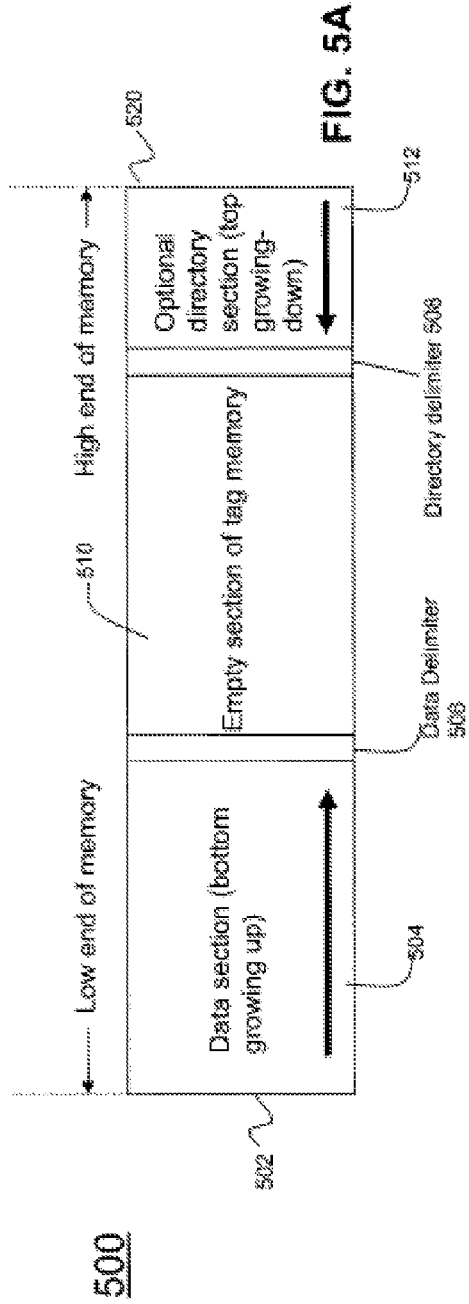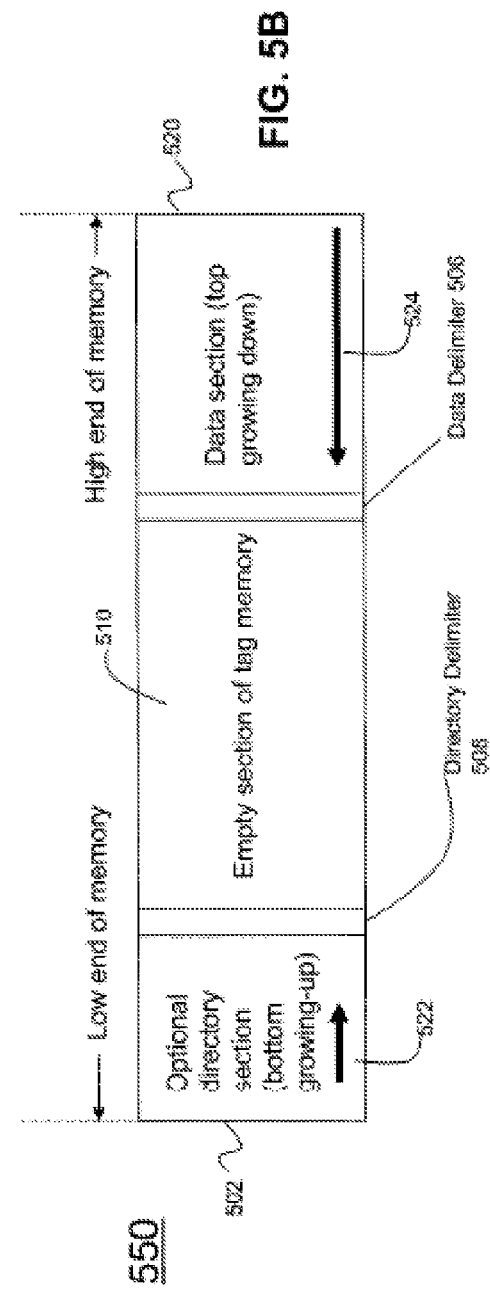

DELIMITED READ COMMAND FOR EFFICIENT DATA ACCESS FROM RADIO FREQUENCY IDENTIFICATION (RFID) TAGS

BACKGROUND OF THE INVENTION

1. Field of the Invention

This invention relates to Radio Frequency Identification (RFID) technology.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers" or "interrogators".

Traditionally, RFID systems are closed systems. A closed RFID system is locally controlled, and is often restricted to a specific location, and/or involves specific types of RFID tags and tag readers. Such a closed RFID system is not well-suited to businesses with dynamic operating environments. For example, if a company has several independent subsidiaries located at different geographical locations, and a movement of tagged objects is necessary between the subsidiaries, then similar RFID system infrastructure must be deployed at multiple locations, increasing operating costs. Thus, a need to shift towards an open RFID system has been felt by RFID system users.

In an open RFID system, individual tags within a population of tags have varying amounts of memory, filled with varying amounts of data. An RFID reader is therefore faced with the non-trivial problem of issuing optimized read commands for the "right" amount of data. If the reader reads too little in one round of communication, then multiple read commands must be issued, and received data from the tags must be parsed from each read to determine if an additional read is required. If the reader reads too much, air time is wasted transmitting empty bytes from the tag. In a worse condition, if the issued read command attempts to read data from a number of memory locations exceeding the size of the memory in the tag, the tag will respond with an error code instead of transmitting any data.

One conventional way to address the above described problems is to store on each tag a size indicator of how many locations of memory currently contain data. This size indicator is transmitted to the reader when the reader issues a read command. However, if this size indicator data is "perma-locked", i.e. incapable of being updated, then additional data items cannot be added later to update information regarding the tagged object. If the size indicator data is not perma-locked, then accidental or malicious tampering of the memory location containing the size indicator data can disable other significant data written (and possibly even locked) elsewhere on the tag's memory. Adding a directory structure to the tag memory to indicate where specific data items are located does not solve this problem, because the current size of the directory is also by its nature dynamic, and the directory size, as well as the size indicator data change, as new data items are added or deleted.

In an open system, an RFID reader must be able to parse data bits in a tag's user memory according to a known format or else the data transmitted from the tag cannot be interpreted. An existing data format, defined by the International Standards Organization (ISO) and the International Electrotechnical Commission (IEC) in the ISO/IEC 15962 standard document, describes an exemplary standardized format. However, the ISO/IEC 15962 standard precedes the introduction of the Generation-2 Ultra High Frequency RFID protocol ("Gen-2" in short), defined by RFID standards organization EPCglobal (EPC stands for Electronic Product Code). Presently, EPCglobal and ISO are working to specify a standard Gen 2 user tag memory format.

Example standardized formats are targeted at efficient encoding of a finite number of data items in a suitable format. One exemplary format uses a "Packed Object" that contains a localized directory of the data items within that object. Another exemplary format supports the ability to successively add more Packed Objects to a tag's memory over time in addition to signal an optional external directory for more efficient random access of data on a tag containing a large number of packed objects. Details of the directory structure are discussed in U.S. patent application Ser. No. 11/806,050, filed May 29, 2007, entitled, "Data Format for Efficient Encoding and Access of Multiple Data Items in RFID Tags" (the '050 Application), which is incorporated herein by reference in its entirety. The '050 application suggests storing the size of the memory bank near the start or lower end of memory, so that data (or directory) information at the far or higher end of the tag can be accessed without a need to lookup the tag's identification number, known as the TID.

The exemplary formats (including the present ISO methods for data and directory storage, the various data encoding formats including the Packed Object format, and the various natural extensions of the Packed Object format to support an external directory) have one feature in common. The end of currently-written data is indicated by using a zero-valued delimiter pattern (usually a zero-valued byte) at the location where a new data object (or directory entry) is expected to begin.

Therefore, what is needed is an efficient and standardized way of accessing variable amounts of data from a tag's memory, where communication resources are optimized by correctly recognizing an end of currently-written data when an intended delimiter data pattern is identified, while ignoring spurious delimiter data patterns.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 5A and 5B show logical map of a tag memory with data and optional directory section, and appropriate delimiter (s), according to embodiments of the present invention.

The present invention will be described with reference to the accompanying drawings. The drawing in which an element first appears is typically indicated by the leftmost digit(s) in the corresponding reference number.

DETAILED DESCRIPTION OF THE INVENTION

In embodiments of the present invention, an RFID reader transmits a command causing a tag to read the optimal amount of data from the specified memory location, without having to read a current-size-indicator data from the tag's memory. Simultaneously, embodiments of the present invention specify a standard format for encoding data in the tag's memory for optimized access by a reader in a variety of RFID systems (open, closed, or a combination of open and closed systems).

Embodiments of the present invention achieve efficient access to data written in a tag's memory by using a delimited read command. As will be clear in the subsequent description, a delimited reverse read command can also be issued by a reader when appropriate. Delimited forward read refers to accessing data upwards starting from a lower memory location to a higher memory location. Delimited reverse read refers to accessing data downwards starting from a higher memory location to a lower memory location.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments whether or not explicitly described.

Furthermore, it should be understood that particular bit, byte, or multi-byte word values of '0' or '1' are used in examples provided herein to represent data for purposes of illustration only. Data described herein can be represented by either bit, byte, or multi-byte word value, and embodiments described herein can be configured to operate on either bit, byte, or multi-byte word value, as would be understood by persons skilled in the relevant art(s).

1. Example RFID Environment

Before describing embodiments of the present invention in detail, it is helpful to describe an example RFID communications environment in which the invention may be implemented.

Figure 1:
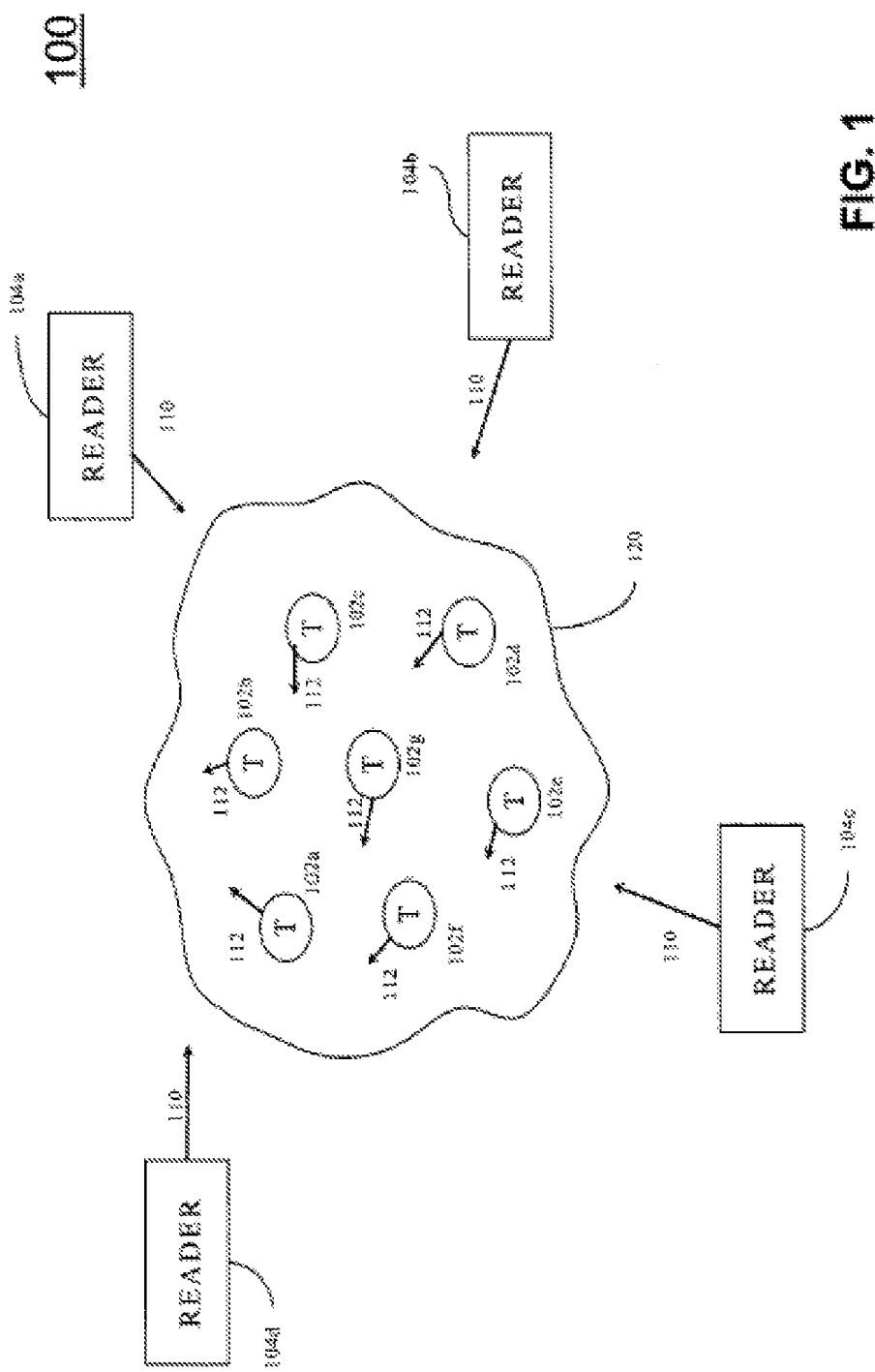
FIG. 1 shows an environment where RFID readers communicate with an exemplary population of RFID tags.

FIG. 1 illustrates an environment 100 where RFID tag readers 104 communicate with an exemplary population 120 of RFID tags 102. As shown in FIG. 1, the population 120 of tags includes tags 102a-102g. A population 120 may include any number of tags 102.

Environment 100 includes any number of readers 104. For example, in FIG. 1, environment 100 includes a first reader 104a, a second reader 104b, a third reader 104c, and a fourth reader 104d. Readers 104 may be requested by an external application to address the population of tags 120. Alternatively, readers 104 may have internal logic that initiates communication, or may have a trigger mechanism that an operator of a reader 104 uses to initiate communication. Readers 104a-d may also communicate with each other in a reader network.

As shown in FIG. 1, readers 104 transmit an interrogation signal 110 having a carrier frequency to the population of tags 120. Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104 receive and obtain data from response signals 112, including but not limited to, an identification number of the responding tag 102. In the embodiments described herein, a reader may be capable of communicating with tags 102 according to any suitable communication protocol, including Class 0, Class 1, EPC Gen-2, other binary traversal protocols and slotted aloha protocols, any other protocols mentioned elsewhere herein, and future communication protocols. Additionally, tag population 120 may include one or more tags having the packed object format described herein and/or one or more tags not using the packed object format (e.g., standard ISO tags).

2. Example RFID Reader and Tag Components

Figure 3:
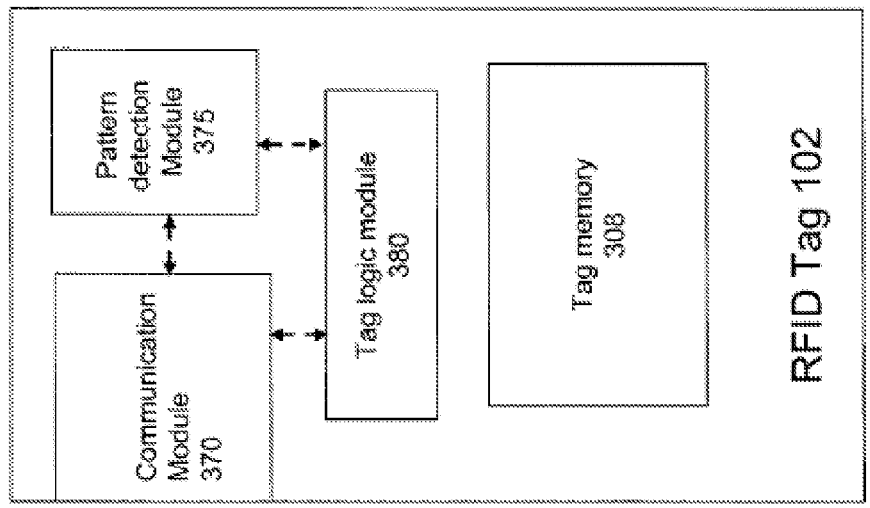
FIG. 2 and FIG. 3 show example components of an RFID reader and a RFID tag, respectively, according to an embodiment of the present invention.
Figure 2:
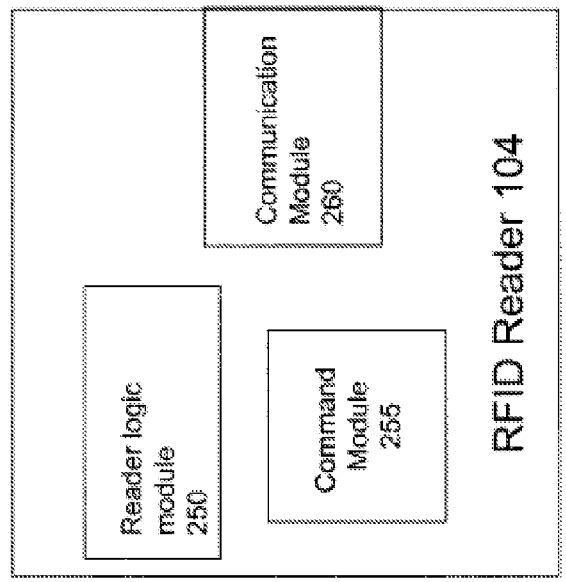

FIGS. 2 and 3 show some of the example components of reader 104 and tag 102, respectively. Reader 104 and tag 102 may include more components not shown in FIGS. 2 and 3. Although in FIGS. 2 and 3, different modules are shown as individual blocks, they can be included within a larger functional module. Functionality of the modules may be implemented in hardware, software, firmware, or a suitable combination thereof.

Reader 104 in FIG. 2 comprises a reader logic module 250, a command module 255, and a communication module 260, among other components. Modules 250, 255, and 260 are coupled to each other. Command module 255 issues a delimited read command. In a typical round of tag interrogation, communication module 260 (which may include an antenna, not shown in FIG. 2) transmits the issued delimited read command to tag 102 via signal 110. The delimited read command can be implemented as a Gen-2 optional command, if so agreed by EPCglobal and ISO, or as a Gen-2 custom command. Either way, it is preferred that the delimited read command mimics the standard read command used in existing systems by readers 104.

Communication module 260 receives backscattered signal 112 from tag 102, where signal 112 includes data read-out from tag 102's memory. Reader logic module 250 parses transmitted data from tag 102, and updates parameters of the delimited read command to be issued by command module 255 in the subsequent round of tag interrogation.

Tag 102 in FIG. 3 comprises a communication module 370, a pattern detection module 375, a tag logic module 380, and a tag memory 308, among other components. Tag logic module 380 is coupled to communication module 370 and pattern detection module 375. Pattern detection module 375 is coupled to communication module 370.

Communication module 370 is configured to communicate with RFID reader 104. Communication module 370 may include an antenna, not shown in FIG. 3. Communication module 370 receives the read command, including, but not limited to, delimited read command, via signal 110. Communication module 370 also transmits signal 112 to the interrogating reader 104 in response to the received read command, where signal 112 comprises read-out data from tag memory 308.

Tag memory 308 comprises a plurality of memory locations, where data is written using some formatting technique. One of the formatting techniques is known as the "Packed Object" formatting technique, as will be discussed later. The present invention can support, but is not limited to, tags that use Packed Object data formatting technique. Tag memory can be of any size. Tags with smaller memory capacity are sometimes referred as "small tags", and tags with larger memory capacity are sometimes referred as "big tags" or "large tags".

Pattern detection module 375 is configured to identify a specified delimiter data pattern, when data is being read from tag memory 308. As soon as pattern detection module 375 detects the predefined delimiter data pattern, pattern detection module 375 communicates that event to tag logic module 380.

Tag logic module 380, which is coupled to both pattern detection module 375 and communication module 370, may be configured to determine whether the detected pattern is indeed an intended delimiter data pattern, or a false delimiter data pattern. If tag logic module 380 affirmatively determines the occurrence of a delimiter data pattern, tag logic module 380 is configured to cause the tag to stop reading out further data. Note that a tag logic module 380 may or may not be configured to distinguish a false delimiter pattern from an intended delimiter pattern.

2.1 Example Logical Structure of Tag Memory

As mentioned earlier, the present invention works with various types of RFID tags with various types of memory configurations. Tag memory 308 may be divided into banks of memory, or may be a continuous structure. Depending on the size and organization of memory, various types of delimited read or delimited reverse read commands may be issued.

Figure 4:
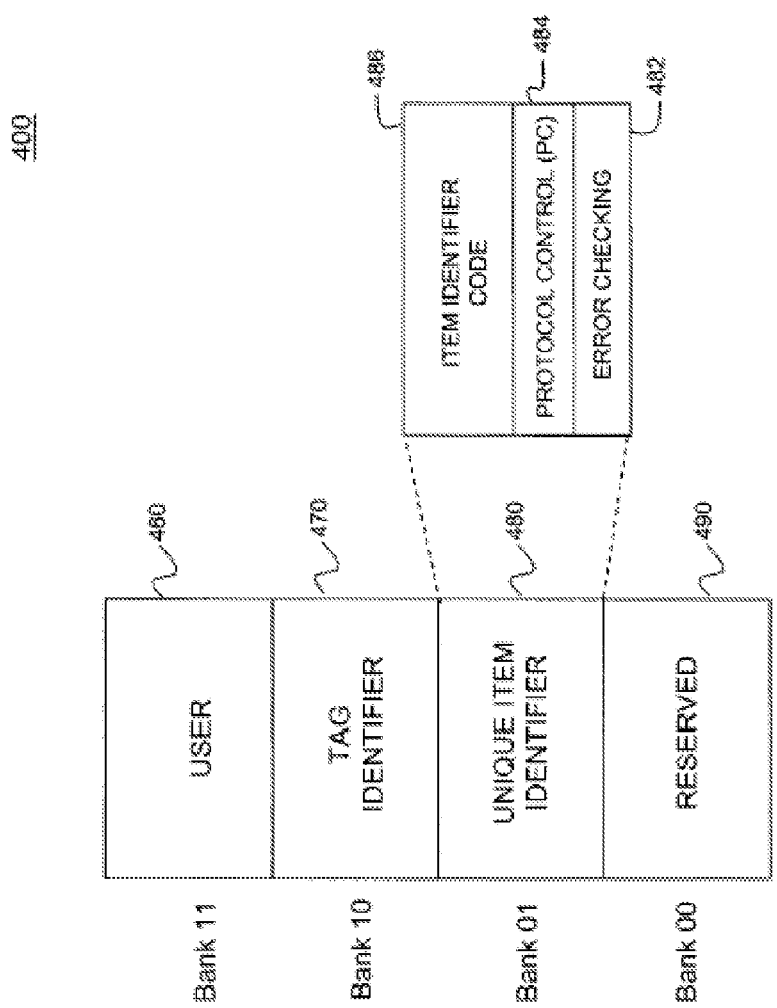
FIG. 4 shows a logical representation of memory in an example Gen 2-type RFID tag.

One example type of tag 102 is a Gen-2 tag. FIG. 4 depicts a logical memory map 400 for a Gen-2 tag memory. Tag memory 308 for a Gen-2 tag 102 includes a user memory bank 460 (bank 11), a tag identifier bank 470 (bank 10), a unique item identifier bank 480 (bank 01), and a reserved bank 490 (bank 00). Each bank may have any number of memory words. Additionally, the format of one or more memory banks may be established by an industry, governmental, standards, or other similar type of organization.

User memory bank 460 is configured for user-specific data storage. Tag identifier (TID) bank 470 is configured to store identification information for a tag. For example, TID bank 470 may store an allocation class identifier for the tag and information regarding the unique commands and/or optional features supported by the tag. Unique Item Identifier (UII) bank 480 is configured to store an error checking code 482 (e.g., a CRC-16), protocol control (PC) bits 484, and an item identifier code 486. In an embodiment, PC bits 484 include one or more application family identifier (AFI) bits (e.g., PC bit 17). Item identifier code 486 may identify the object to which the tag is attached. Reserved bank 490 is configured to store the kill and access passwords for a tag.

2.2 Example Organization of Tag Memory

FIGS. 5A and 5B show illustrative representations of logical organization of data and optional directory sections in a tag memory 308 that include delimiters to indicate the end of data and/or the end of a directory, according to embodiments of the present invention. Units of memory may be bytes or words. Embodiments of the present invention can be applied to access either the data portion, or the directory portion, or both the data and the directory portions of tag memory 308. The optional directory portion includes information about the arrangement of the data stored in the memory bank.

FIG. 5A shows a memory configuration 500 where data is written starting from lowest memory location 502 of tag memory 308 and growing upwards. In other words, data section 504 has a bottom-growing-up structure. Lowest memory location 502 may be the lowest address of user memory bank 11 in case of a Gen-2 tag shown in FIG. 4. Lowest memory location 502 may also be the first location of the entire memory in cases where memory is not divided into different sections.

A data delimiter 506 may be written to indicate end of written data section 504. Empty section 510 of tag memory 308 follows data delimiter 506. Data delimiter 506 is a predefined pattern. It may be a string of zeros, a string of ones, or an arbitrary sequence of zero and one bits, as long as the arbitrary pattern is predefined.

Commonly, a byte or a word of all zeros is specified as the delimiter pattern. Such a fixed pattern of all zeros can be easily detected by tag logic module 380 when reading out data for transmission. For example, OR-ing together eight consecutive bits results in a byte value of '1' for any pattern except a pattern of all zeros.

Instead of using a delimiter pattern of all zeros, a delimiter pattern of all ones can be selected, which can also be detected by tag logic module 380. Alternatively, any arbitrary delimiter data pattern may be pre-specified, and tag logic module 380 can (with somewhat more complex hardware logic, including a register to store the pattern) sense a match to that specific delimiter data pattern. Throughout this application, a delimiter data pattern of all zeros is commonly used by example, but other patterns can be used within the spirit of this invention, as just described.

Configuration 500 may include a directory section 512. If directory section 512 exists, it has a top-growing-down organization, i.e. directory entries are written starting from the highest memory location 520 and growing downwards. A directory delimiter 508, whose pattern may be identical or different from data delimiter 506, may be included to indicate end of currently written directory entries.

As will be clear from subsequent discussion with respect to flowcharts 6-8, persons skilled in the relevant art will understand that an efficient delimited read command may need only one of the delimiters 506 and 508. Thus, depending on the application, either of delimiters 506 and 508 may be made optional, or excluded.

FIG. 5B shows a memory configuration 550 where data is written starting from highest memory location 520 of tag memory 308 and grows downwards. In other words, data section 524 has a top-growing-down structure. A data delimiter 506 may be written to indicate end of written data. Empty section 510 of tag memory 308 follows data delimiter 506 in a downward direction.

Configuration 550 may include a directory section 522. If directory section 522 exists, it has a bottom-growing-up organization, i.e. directory entries are written starting from lowest memory location 502 and growing upwards. A directory delimiter 508, whose pattern may be identical or different from data delimiter 506, may be included to indicate end of currently written directory entries. As in the case of configuration 500, depending on the application, either of delimiters 506 and 508 may be made optional, or excluded.

Figure 5C:
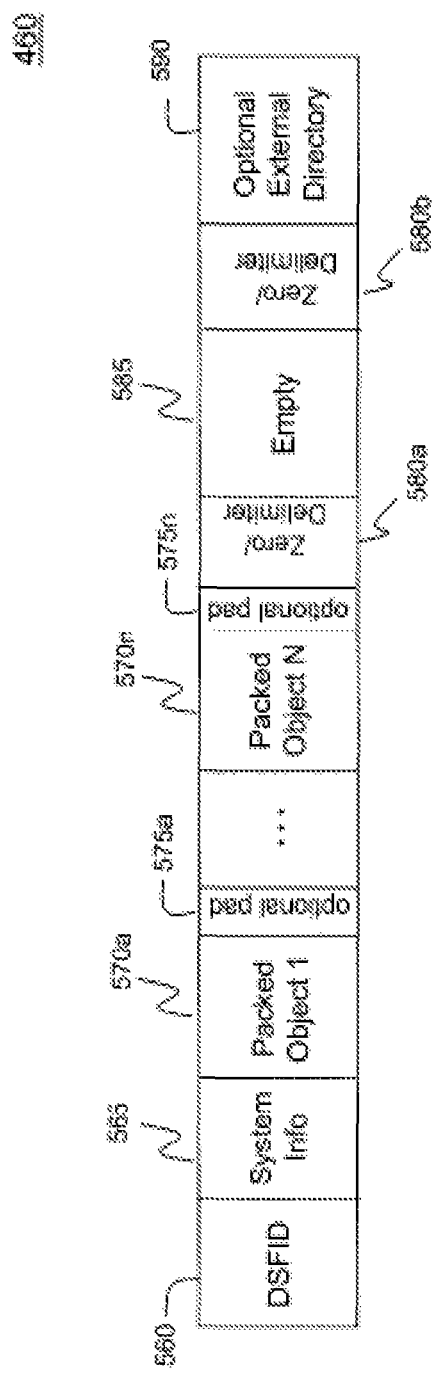
FIG. 5C shows a high level Packed Object data format for the user memory of a Gen-2 RFID tag, according to an embodiment of the present invention.

While FIGS. 5A and 5B show more generic configurations of a memory for a tag 102 that can accept a delimited read command, FIG. 5C depicts a particular embodiment of a Gen-2 tag 102 that uses a "Packed Object" formatting technique for data writing and encoding in its user memory bank 460 (shown in FIG. 4). "Packed Object" format facilitates efficient access of tag data by RFID reader 104. Delimited read command works well with data formatted in the "Packed Object" format. However, delimited read command is not limited to tags that use Packed Object format, and works with other tag formats as well.

As shown in FIG. 5C, user memory bank 460 includes an optional data storage format identifier (DSFID) 560, a system information field 565, one or more packed objects a-n, one or more optional zero or other valued byte(s) 580 (which may be used as delimiter pattern(s) in some embodiments that support delimited read commands), an optional empty field 585, and an optional external directory 590. Optional pads 575a-n may be included between any two packed objects or after the last packet object 520n and zero/delimiter byte 580a. Optional pads 575 are used for aligning various parts of user memory bank. Optional pads 575 are signaled by using an otherwise-invalid pattern in the initial bits (e.g., initial 6 bits) of what would be the second or subsequent packed object 570. For example, a value of 100100BB may be encoded in optional pads 575a to align the next packed object 570b. Such alignment can be useful for many purposes, including simpler access using word-aligned reads, better ability to apply passwords or otherwise control access to complete packed objects 570a-n, and more efficient indexing and random access to packed objects 570a-n via use of an optional external directory 590.

Zero/Delimiter byte 580a may precede the first packed object 570a, or succeed the last packed object 570n, depending on the sequence of writing successive data, and depending on existence and location of optional external directory portion 590 with respect to packed objects 570a-n. Delimiter pattern 580a is equivalent to data delimiter 506 shown in FIGS. 5A and 5B. Optional zero byte/delimiter pattern 580b is equivalent to directory delimiter 508 shown in FIGS. 5A and 5B. Note that the purpose of byte 580 is not limited to indicating end of data/directory, and it may be configured to carry other formatting information in alternative embodiments.

User memory bank 460 may also include a system information section 565. System information section 565 may include hardware or system information about the tag and/or sensor information if the tag has an associated sensor. User memory bank 460 may also include a variable number of empty bytes 585 where future data or directory entries may be added.

Optional external directory 590 may be located at the front of user memory bank 460 or at the end of the series of packed objects 570. Note that one or more bytes may be included following the DSFID 560. For example, these bytes may be reserved for a specific current use or marked for future use.

Note that packed object tags can be intermixed in a tag population with non-packed object tags. This highlights the backward compatibility feature of the user memory bank format described herein. Therefore, packed object tags, if unformatted, begin with a first byte of zero. If formatted, packed object tags include the necessary set of information to indicate their configuration (i.e., packed object) to a reader.

There are several advantages of Packed Object formatting. The structure of a packed object 570 explicitly encodes the size (in bytes) of packed object, allowing for speedier sequential access. In addition, the structure provides the option for storing multiple data items, including items from different data systems, within one packed object 570. This storage format minimizes the bit-overhead entailed in encoding each distinct packed object 570, and allows the data content from multiple data elements to be concatenated before compacting, preventing wasted pad bits at the end of each data item. Furthermore, the packed object 570 structure described herein has the flexibility of working either with or without an optional external directory section 590. Packed Object format provides a degree of random access, without incurring the bit-overhead of adding a full directory section as does the ISO Directory method. This is achieved by grouping all the Header ID index values for a given packed object 570 at the front of the packed object 570, creating a "mini-directory" (not shown in FIG. 5C) for each packed object 570. Unlike the ISO Directory method, in the packed object format, there is no need to repeat the ID values in two different areas of the tag memory.

The above description of Packed Object formatting technique is included for illustrative purposes only. Persons skilled in the art will appreciate that other data encoding formats are also within the scope of the present invention. In the following sections, the terms 'object' or 'data object' are used to mean encoded data, which may or may not have 'Packed Object" formatting.

3. Data Access Method Using Delimited Read Command

An interrogator may access a tag's memory using a delimited read command or a delimited reverse read command. A delimited read command causes a tag to read data in an upwards direction starting from a specific memory address location for a predefined number of bytes or until a delimiter pattern is reached. A delimited read command transmitted by a reader 104 can have several parameters, including, but not limited to, a start address, and a read-length indicator. For example, DelimitedReverseRead(startAddress, n) command denotes that a maximum of 'n' bytes or words should be read starting from the memory address location denoted by 'startAddress'. As discussed before, a delimited forward read or a delimited reverse read command may be necessary depending on tag memory configuration. A delimited read command may also include a memory bank selector. A memory bank selector may be used in environments in which a tag's memory bank has different sections such as Gen-2 tag shown in FIG. 4. A delimited read command may also accept an arbitrary delimiter pattern as one of the command parameters. The delimiter pattern is then used by the receiving tag during processing to identify the end of data. If the delimiter pattern is not included in the command, a default delimiter (e.g., zero-byte) is used.

An exemplary delimited read command is illustrated below.

DelimitedRead (Memory Bank, StartAddress, n)

In the above exemplary DelimitedRead command, the memory bank field indicates the memory bank to access during the read operation. This field is optional. As described above, a Gen-2 tag has four defined memory banks. Therefore, in Gen-2 implementations, the memory bank field may be present. However, for other tag configurations, a memory bank field may not be required.

StartAddress is the address from which the tag begins the read operation. The integer, n, is the read-length indicator which defines number of bytes which the tag is instructed to read. In an embodiment, when 'n' is a predefined value (e.g., '0'), the tag attempts to read the entire memory bank. A DelimitedRead command causes the tag to read either the predefined number of bytes (for 'n' not equal to '0') or until a delimiter pattern is detected.

Delimited reverse read refers to accessing data downwards starting from a higher memory location to a lower memory location.

A delimited reverse read command causes a tag to read data in an downwards direction starting from a specific memory address location for a predefined number of bytes or until a delimiter pattern is reached. An exemplary delimited reverse read command is illustrated below.

DelimitedReverseRead (Memory Bank, StartAddress, n)

In the above exemplary DelimitedReverseRead command, the optional memory bank field indicates the memory bank to access during the read operation. The StartAddress is the address from which the tag begins the read operation. The integer, n, is the read-length indicator which defines number of bytes which the tag is instructed to read. In an embodiment, when 'n' is a predefined value (e.g., '0'), the tag attempts to read the entire memory bank. A DelimitedReverseRead command causes the tag to read either the predefined number of bytes (for 'n' not equal to '0') or until a delimiter pattern is detected.

3.1 Delimited Read Processing from Reader Perspective

Figure 6:
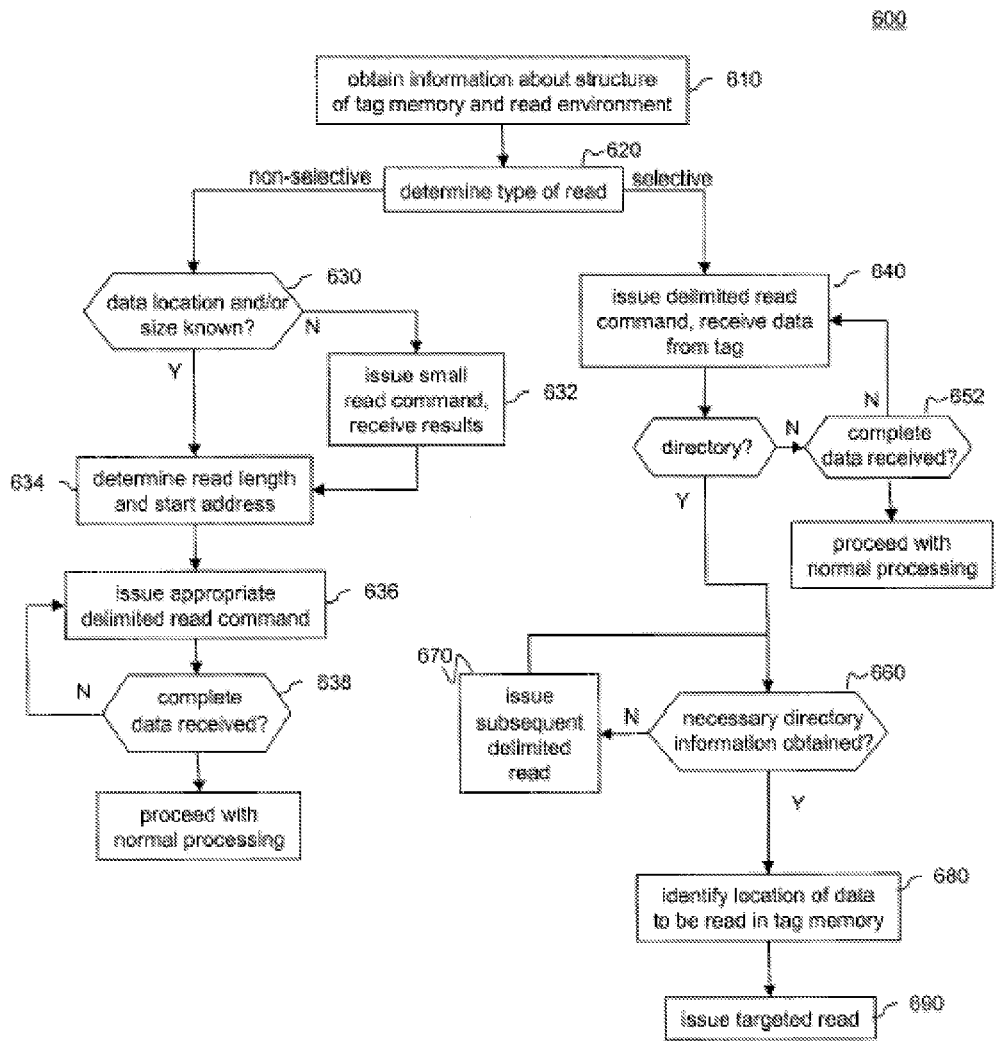
FIG. 6 depicts a flowchart of an exemplary method for efficient data access from the perspective of a reader, according to embodiments of the present invention.

FIG. 6 depicts a flowchart 600 of an exemplary method for efficient data access from the perspective of a reader, according to embodiments of the present invention. Flowchart 600 is described with continued reference to the embodiments of FIGS. 2-5. However, flowchart 600 is not limited to those embodiments. Note that steps in flowchart 600 do not necessarily occur in the order shown. There may be additional intermediate steps that are not shown in FIG. 6. Some of the steps may be optional, and/or specific to particular embodiments.

In step 610, the reader obtains information regarding the structure of tag memory 308 and/or information regarding the current read environment. Step 610 is optional. In an embodiment, reader 104 consults information stored in a reader database. The stored information may have statistics from prior successful and/or failed read attempts. Also, information about tag population, or specific system information may be stored to facilitate subsequent reads.

In an additional or alternative embodiment, reader 104 reads TID section of tag 102 to gather identification information related to a particular tag or a population of similar tags. TIED section may have information about what format of encoding is used in the tag memory and/or information about whether the tag has a directory, and if so, whether the directory is at the top end or bottom end of memory. A TIED read may also provide information regarding data organization, i.e. whether data is in a bottom-growing-up configuration, or in a top-growing down configuration. However, in some embodiments, a simple TID read may not provide tag memory organization information. In that case, an initial delimited read command or a regular initial read may be necessary, especially for large tags.

Reader 104 may also determine in this step whether a default delimiter pattern adopted by the communication standards or a custom pattern is being used in a system. If a custom pattern is being used, reader 104 may include the custom pattern as an additional parameter in the subsequent delimited read (or reverse read) command issued to the tag population.

Reader 104 may also determine noise level in a system. For example, if the system is noisy, the likelihood of transmission errors increases. Therefore, reader 104 may opt to perform a shorter targeted read rather than a read of a large block of data.

In step 620, the type of read is determined. If a selective read of a tag is required, operation proceeds to step 640. A selective read operation reads only a subset of data stored in a tag. If a non-selective read (e.g., all tag data to be read) is required, operation proceeds to step 630. A non-selective read operation reads the entire content of a tag's memory (or of a designated tag memory bank). Reader 104 may use all or a subset of the information obtained in step 610 to make this determination. For example, if a significant number of "very large tags" are expected in the population coupled with a moderate or worse signal/noise ratio, reader 104 may choose to issue an initial Delimited Read (0, n) command for a subset of data rather than a Delimited Read (0,0) to minimize the probability of a bit error forcing a retransmit.

Steps 630-638 describe the non-selective read operation.

In step 630, a determination is made whether the location of tag data is known (e.g., is tag data at top or bottom of memory). Additionally, in this step, a determination may be made whether the size of tag memory is known. If the necessary data is not known, operation proceeds to step 632. If the necessary data is known, operation proceeds to step 634.

In step 632, reader 104 issues a small initial read command of the low memory and receives the data from the tag. Because a selected read is not the goal, reader 104 may choose to precede the unbounded read command (e.g., DelimitedRead (0,0)) with a very short Read (e.g., a couple of words) at the bottom of tag memory. This small read is sufficient to determine the format of the tag data and would reveal whether the desired data is stored at the top or bottom of tag memory. The directory section would not be completely scanned by the short initial read, but in the scenario of steps 630-638 the directory information is not required.

In step 634, reader 104 utilizes information obtained from the initial read of 632 (or alternatively from step 610) to determine the start address for the command (e.g., the highest address of the stored data in the case of a top growing down data section). Reader 104 may also determine a read-length, e.g., 'n' versus '0', based on prior statistics on read length and/or the number of retries due to noise.

In step 636, the appropriate delimited read command is issued and corresponding data received in response. For example, if the data is stored as bottom-growing-up, reader 104 issues a DelimitedRead (0,0) or DelimitedRead (0,n) command. If the data is stored as top-growing-down, reader 104 issues a DelimitedReverseRead (startAddr, 0) or DelimitedReverseRead (startAddr, n) command.

The non-selective read embodiment is optimal for smaller tags which tend to not sacrifice space for an external directory. In these tags, data in the form of one or more zero-delimited packed objects is stored at the start of memory. In this case, a single DelimitedRead (0,0) command can access all of the packed object currently stored in memory without wasting any air time reading the "empty" trailing portion of the memory bank.

In step 638, a determination is made whether the entire data section of the tag is received. This step is optional. As described below, unless formatting measures such as "bit stuffing" are employed for packed objects, a false delimiter may be encountered in a packed object, causing the tag to terminate transmission. In this case, only a subset of the tag data is returned. If reader 104 determines that the complete data has not been received, operation returns to step 636 when a subsequent delimited read command is issued. In this case, the start address for the subsequent delimited read is determined based on the amount of data received. If the complete tag data is received, operation proceeds to step 695 where normal data processing occurs.

Steps 640 through 690 describe a selective read of an RFID tag.

In step 640, an unbounded delimited read command (e.g., DelimitedRead (0,0)) is issued to retrieve the directory from the tag and a response received from the tag.

In step 650, a determination is made whether a directory was returned in step 640. If a directory was returned, operation proceeds to step 660. If data was returned, operation proceeds to step 652. Data may returned if no external Directory is used in the tag or alternatively if the tag includes a "top-growing-down" external directory. If no external Directory is used, the unbounded delimited command accesses the packed objects currently stored in memory without wasting any air time reading the "empty" trailing portion of the memory bank.

If a "top-growing-down" external directory is implemented in the tag, the initial delimited read will pick up data (including the existence of a directory at the top of the memory) rather than the directory information itself. Although operationally correct, this scenario loses the advantage of the encoded directory when only one or a few data items were search targets. Furthermore, air time is wasted transmitting all of the data items from the tag. This is one reason why a "top-growing-down" directory is not preferred.

If a "bottom-growing-up" external directory is chosen, then this initial DelimitedRead obtains much or all of the directory including the locations of the data items at the top of the memory. If a targeted/selective search is in progress, then this information leads to a very efficient read (or reads) to retrieve the data item(s) of interest.

In step 652, a determination is made whether the entire data section of the tag is received. This step is optional. As discussed above, a subset of the tag data may be returned due to a false delimiter pattern being encountered during tag processing. If reader 104 determines that the complete data has not been received, operation returns to step 640 when a subsequent delimited read command is issued. In this case, the start address for the subsequent delimited read is determined based on the data received. If the complete tag data is received, operation proceeds to step 695 where normal data processing occurs.

In step 660, a determination is made whether the entire directory was obtained. If the entire directory was not obtained, because of a short read length in the initial read or the occurrence of a false delimiter, operation proceeds to step 670.

In step 670, reader 104 issues a subsequent delimited read command to obtain the remainder of the directory. In this step, the start address for the subsequent delimited read is based on the extent of the directory previously returned.

In step 680, reader 104 identifies the location of data item or items of interest for the selective read.

In step 690, reader 104 issues a targeted read or reads to obtain the data item or items of interest.

In step 695, normal processing of the retrieved data occurs.

3.2 Encoding Methods

Figure 7:
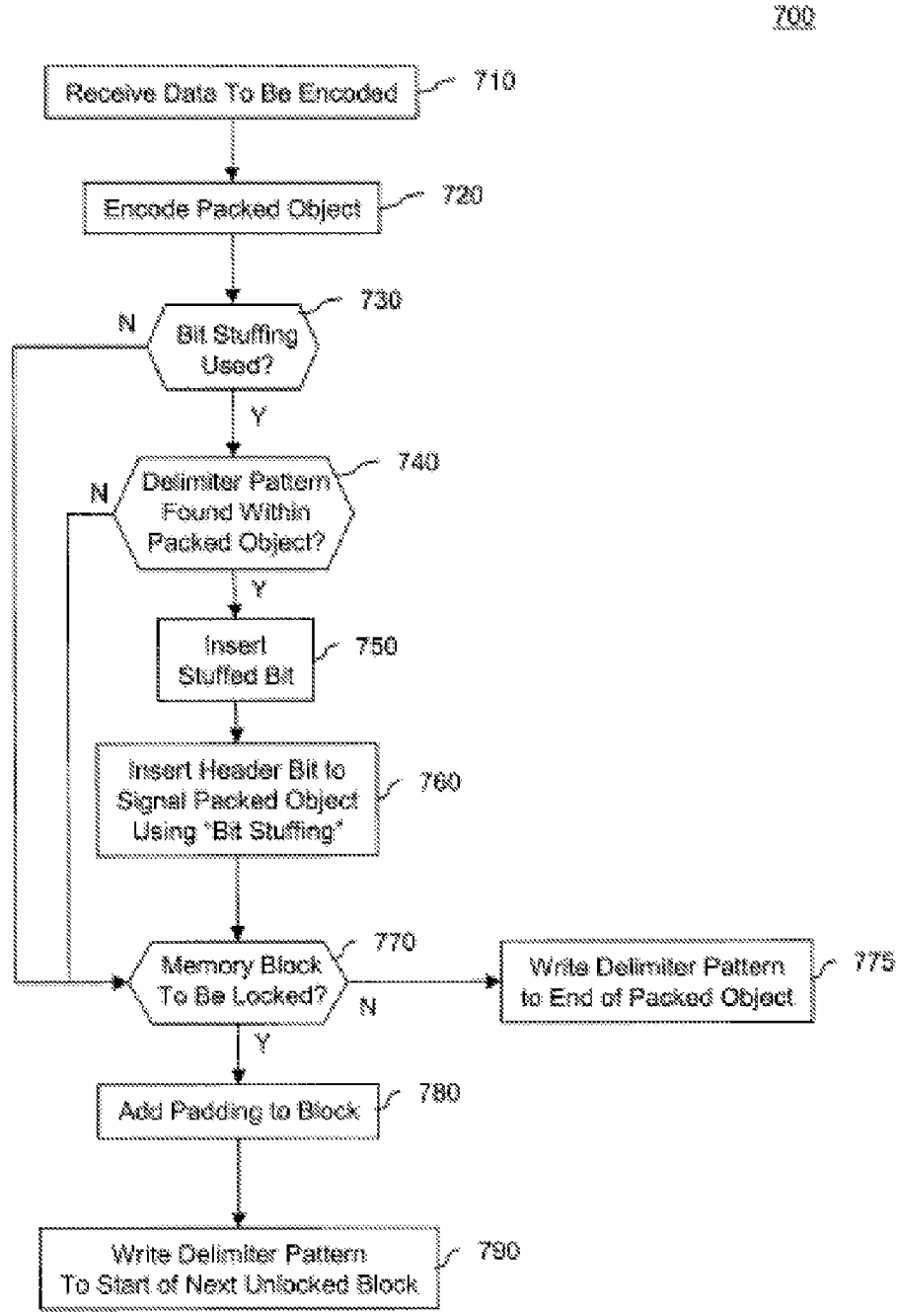
FIG. 7 illustrates an exemplary flowchart of a method for encoding data, according to embodiments of the present invention.

FIG. 7 illustrates an exemplary flowchart 700 of a method for encoding data, according to embodiments of the present invention. The steps of the flowchart 700 are for illustrative purpose only, and do not have to take place in the order shown. There may be additional intermediate steps that are not shown in FIG. 7. Also, different embodiments may not use all the steps shown in FIG. 7. Components shown in FIG. 3 may perform various steps of flowchart 800, but the steps of flowchart 700 are not limited to the embodiment shown in FIG. 3.

In step 710, data to be encoded in tag 102 is received.

In step 720, one or more data objects and optionally an associated directory are encoded. In an embodiment, the data objects and directory are encoded to minimize the likelihood of a false delimiter being encountered within the data and/or directory.

For example, a special formatting of data objects and directory entries may be defined and used while writing and/or encoding data in the tag's memory. As discussed before, "Packed Object" formatting may be an effective format in this regard. Other ISO formats may be used too.

It is noted that, eliminating the possibility of appearance of delimiting patterns within an object by proper formatting is a naturally effective solution for the directory section by virtue of the characteristic information contained in a directory object. An external directory object is likely to contain few if any zero-valued bytes or words within it. This holds true, because a directory object comprises one or more of the following elements: the size of the data portion and the total number of data item ID values, and a list of the ID values themselves. None of these elements is likely to have a byte value of zero.

The data portions of a memory, however, are typically unrestricted sequences of bits, and merely adopting a basic data storage formatting, may not be enough to eliminate the probability of encountering false delimiter data patterns. In an example scenario, a pattern identical to the specified delimiter pattern randomly shows up within data as part of the actual data stream, rather than at the end of data stream, or in case of a formatted memory, at the end of data objects, where the next data object is supposed to start. If a zero byte is selected as the delimited pattern, unrestricted bit sequences in the data section, on an average, may have a zero byte once out of every 256 bytes encoded. That zero byte within the data object can be mistaken as the intended delimiter data pattern. The longer the encoded sequence, the more likely a false delimiter data pattern will appear.

Additional formatting techniques can be used to eliminate or further reduce the occurrence of delimiter data patterns within data objects. In an embodiment, a "bit stuffing" technique is applied to increase effectiveness of data access by delimited read (or reverse read) command. Steps 730-760 define an exemplary bit stuffing technique. Steps 730-760 are optional.

In step 730, a determination is made whether "bit stuffing" is used to encode packed objects. If "bit stuffing" is used, operation proceeds to step 740. If "bit stuffing" is not used, operation proceeds to step 770.

In step 740, a determination is made whether the delimiter pattern (e.g., a zero byte) is detected within the encoded packed object. If the delimiter pattern is detected, operation proceeds to step 750. If the delimiter pattern is not detected, operation proceeds to step 770.

In step 750, one or more bits are inserted into the detected pattern. For example, in a tag using Packed Object formatting, the last stage in encoding a packed object 570 would be to insert an extra '1' bit (the stuffed bit) following any detected groups of seven consecutive '0' bits, if that group starts on a byte boundary. When parsing the received data, a decoder in RFID reader 104 recognizes (and discards as the stuffed bit) the least significant bit of every received byte containing the precise pattern '00000001.' Note that, the extra stuffed bit will need to be inserted, on average, once for every 128 bytes encoded. Thus, in spite of having to use an additional layer of formatting, the overhead is fairly low for complete elimination of internal false delimiters.

In step 760, a header is defined, which is included in the data transmitted to a decoder to indicate whether a given packed object uses bit stuffing. Step 760 is optional.

In addition to the issue of false delimiter patterns within a packed objects, the bytes between packed objects may also include false delimiter patterns. For example, a specification for Packed Object formatting allows a new packed object 570b to begin on any byte boundary after the end of the previous packed object 570a, as shown in FIG. 5C. If the governing air interface protocol allows byte-wise addressing of memory, then the new object 570b may begin immediately at the next byte after the previous object 570a. However, other protocols have different alignment requirements. For example, in Gen-2 protocol, new data can only be written on double-byte word boundaries. To support this alignment requirement, a special non-zero 'pad byte' pattern 575a can be used to fill the space after a packed object 570a. If non-zero pad byte pattern 575a is used for every empty byte between successive packed objects, then there is no interference with the delimited read command's operational logic, regardless of block size or alignment requirements.

Evolving Gen-2 requirements, relating to password-protected reads and/or write access to individual data items, may impose additional block-size requirements. In some implementations, a fairly large number of pad bytes are needed to be written to fill out a protected memory block (that block may be 8 bytes, 16 bytes, or even larger) that needs to be locked for security reasons.

If such a block-oriented protection scheme is used, an explicit prohibition against writing a delimiter byte at the end of a data object and then locking that block of memory is necessary, because a delimiter data pattern within a locked block will prevent reader 104 from seeing new data written to subsequent memory blocks. In the case of a locked block containing a delimiter data pattern, after new data is written, the old delimiter data pattern within the locked block needs to be changed to pad bytes, and a new delimiter data pattern needs to be rewritten at the end of the freshly-written data within an unlocked block that follows the locked block.

Steps 770-790 describe an exemplary process for addressing delimiter patterns within a locked block of data. Steps 770-790 are optional.

In step 770, a determination is made whether the memory block including the delimiter pattern is to be locked. If the memory block is not to be locked, operation proceeds to step 775. If the memory block is to be locked, operation proceeds to step 780.

In step 775, the delimiter pattern is written to the end of the last data object (e.g., packed object). Persons skilled in the art will appreciate that variations of delimiting pattern definition can be accommodated to lower false termination probability. For example, the delimiter pattern can be specified as a zero-valued word instead of a more commonly used zero-valued byte. The advantage of defining a zero-valued word as the delimiter pattern is that the appearance of false delimiter pattern now becomes far less statistically likely. The disadvantage is that extra zero bytes must be written to delimit each object. In case of a two-byte word, the 16-bit definition of a valid delimiter pattern can be further restricted to 16 zero bits starting on a word boundary. This further restriction will simplify the tag hardware and will even further reduce the probability of false delimiter data patterns. However, because Gen-2 tags are written only in word increments, the requirement of a delimiter pattern to start on a word boundary can sometimes require two additional zero bytes to be written instead of one.

In step 780, the appropriate padding is added to the locked block. As discussed above, in some implementations, a fairly large number of pad bytes may need to be written to fill out a protected memory block (e.g., 8 bytes, 16 bytes, or larger) that is to be locked. Because all of these pad bytes would need to be conveyed over the air interface in order to Write them, and because physical writes to passive tag hardware are relatively slow, this approach is not optimal.

In an alternate embodiment, undefined byte contents (including zero bytes, if that is the natural state of a given tag's unwritten memory) may be allowed to fill out the end of a locked block. This embodiment eliminates the need for transmitting and "burning" the final padding writes to each block. In this case, however, the first "writer" would also have to write a true delimiter (not a pad) at the start of the next block (leaving it unlocked) so that the end of valid data is unambiguously indicated. The approach of allowing extra zero bytes or undefined contents after a Pad up to the end of the block may also not be optimal because it results in an added burden on every Read operation. Specifically, the hardware-dependent block size would now become necessary knowledge when parsing tag data. Reader 104 would have to skip the bytes after a detected Pad and check the first byte of the next block to determine whether more data is written there.

In an embodiment, reader 104 encodes pad byte information to indicate the length of the pad data in the packed object. For example, a unique Pad pattern may be six bits long, leaving the lowest-order two bits of the Pad byte to serve as a "padding length" indicator. When the two least-significant bits of the Pad byte are '00', '01', or '10', this serves to instruct the parser that 0, 1, or 2 bytes, respectively, following the Pad byte are also Pads and can be skipped, regardless of their values. A value of '11' could be used to indicate that the entire byte after the Pad of "10010011" contains an extended Pad length indicator, indicating that this two-byte Pad sequence is followed by up to 255 bytes of unformatted padding (e.g., to the end of a fairly large protection block).

In step 790, the delimiter pattern is written at the start of the next unlocked block.

3.3 Delimited Read Processing from Tag Perspective

Figure 8:
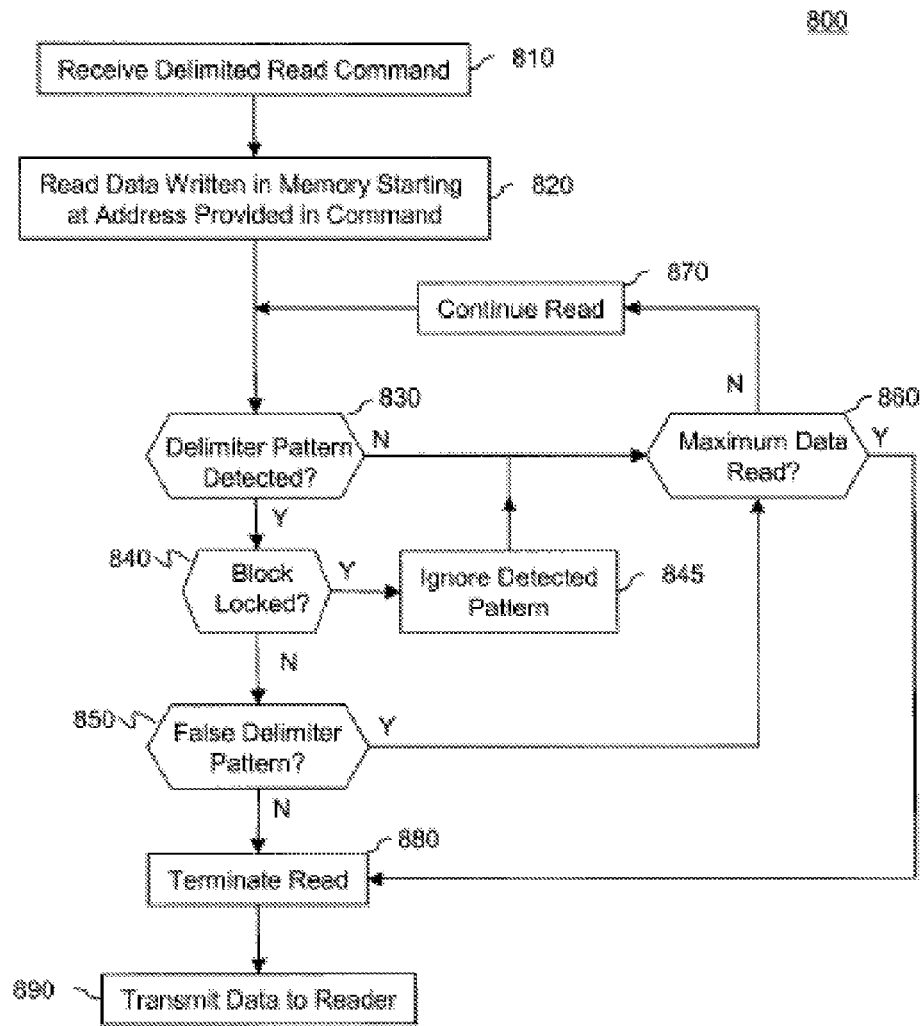
FIG. 8 illustrates an exemplary flowchart of a method for efficient access from the perspective of a tag, according to embodiments of the present invention.

FIG. 8 illustrates an exemplary flowchart 800 of a method for efficient access from the perspective of a tag, according to embodiments of the present invention. The steps of the flowchart 800 are for illustrative purpose only, and do not have to take place in the order shown. There may be additional intermediate steps that are not shown in FIG. 8. Also, different embodiments may not use all the steps shown in FIG. 8. Components shown in FIG. 3 may perform various steps of flowchart 800, but the steps of flowchart 800 are not limited to the embodiment shown in FIG. 3.

In step 810, tag 102 receives a delimited read command or delimited reverse read command, including a start address and a read length. The delimited read command may optionally include an indication of the memory bank to be read and/or an indication of a custom delimiter pattern to use during processing.

In step 820, tag 102 starts reading data in the designated memory, starting at the start address location specified by the delimited read or reverse read command.

In step 830, tag 102 determines whether a delimiter pattern was detected. If a delimiter pattern was detected, operation proceeds to step 840. If a delimiter pattern was not detected, operation proceeds to step 860.

Steps 840 and 845 describe operations for delimited read in a tag supporting locked memory blocks. Steps 840 and 845 are optional. Gen-2 supports the ability to lock individual passwords to prevent or allow subsequent reads and/or writes of that password, the ability to lock individual memory banks to prevent or allow subsequent writes to that bank, and the ability to permalock (make permanently unchangeable) the lock status for a password or a memory bank.

Writing a delimiter pattern within a locked block may be prohibited by reader encoding processes, as described above. If such rules are enforced, the delimiter-detection hardware and/or logic (i.e. pattern detection module 375 and tag logic module 380) in tag 102 may perform the steps of 840 and 845 to address delimiter patterns within a locked block. Steps 840 and 845 take advantage of the fact that a tag's hardware logic knows the size and organization of the tag's protection blocks and also the lock status of those blocks.

In step 840, a determination is made whether the block in which the detected delimiter pattern is locked. If the block is unlocked, operation proceeds to step 850. If the block is locked, operation proceeds to step 845.

In step 845, if the current protection block is locked or perma-locked when a pattern similar to the specified delimiter data pattern appears, the tag logic module 380 ignores the appearance of a spurious delimiter data pattern occurring within a locked block, and continues transmitting data from its memory 308. Operation then proceeds to step 845. In this situation, unless the first "writer" has violated the rules and programmed an invalid tag 102 by not rewriting the delimiter data pattern outside the locked block, the detected delimiter within the locked block must actually be either an accidental data byte, or an unformatted pad byte.

In this scenario, tag 102 transmits all of the zero bytes that constitute 'unformatted padding' at the end of a protected block, but ceases transmission after transmitting the intended delimiter data pattern that the previous data writer/encoder has rewritten as the first byte of the next unlocked block. The rewritten delimiter data pattern may shift to the end of freshly added data in the unprotected block by the time a delimited read command is issued after locking the previous block.

This simple enhancement to the tag logic, i.e., ignoring zero bytes found within locked blocks (as outlined in steps 840 and 845), achieves the desired result of an efficient delimited read command.

In step 850, tag 102 determines whether the delimiter pattern is an intended delimiter pattern, or a false delimiter pattern. Step 850 is an optional step. If it is determined that the detected delimiter pattern is false, operation proceeds to step 860. If it is determined that the delimiter pattern is not false, operation proceeds to step 880.

A read-out cycle may be prematurely suspended because of a false detection of delimiter data pattern, if the tag does not have built-in false delimiter detection logic. A tag may include one or more techniques for identifying a false delimiter pattern.

In an exemplary approach, the tag read terminates on any occurrence of the delimiter pattern. This approach may be acceptable in some systems, because the only impact of an occasional early termination of data read-out is an occasional need to issue a second delimited read command following up the previous delimited read command that got truncated. The second delimited read command resumes reading tag data where the prior delimited read command was truncated. As the consequences of premature truncation are usually minor, issuing a delimited read command still provides significantly improved performance compared to issuing standard read commands.

In an alternative approach, the tag logic detects the starting locations of encoded objects, and thus does not falsely terminate a read-out process, even if it detects the appearance of a pattern similar to the specified delimiter data pattern within an object. In an embodiment of the present invention, tag logic module 380 can be designed to identify which patterns are at the correct locations for a start of a new object or directory entry, and hence, are the intended delimiter patterns.

In step 860, tag 102 determines whether maximum amount of data, as specified by read length parameter in the delimited read command, has been read. If the maximum amount of data has not been read, operation proceeds to step 870. If the maximum amount of data has been read, operation proceeds to step 880.

In step 870, tag 102 continues to read data from memory.

In step 880, the tag 102 terminates the read operation.

In step 890, tag communication module 370 transmits read-out data to reader communication module 260. In an embodiment, the deliminter pattern is included in the data transmitted to the reader. However, in alternative embodiments, tag 102 does not transmit the delimiter pattern to the reader.

4.0 Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for efficiently accessing stored data from radio frequency identification (RFID) tags, the method comprising:
    transmitting a delimited read command that causes an RFID tag to read data stored in tag memory and causes the RFID tag to cease reading the data stored in the tag memory when the RFID tag detects a delimiter pattern in the stored data, wherein the delimited read command comprises one of a Gen-2 optional command and a Gen-2 custom command; and
    receiving a response to the delimited read command from the RFID tag that excludes a portion of the data in the tag memory stored subsequent to the delimiter pattern.

2. The method of claim 1, further comprising:
    prior to the transmitting step, determining a configuration of the RFID tag.

3. The method of claim 2, wherein the transmitting step comprises:
    transmitting a forward delimited read command, when the tag memory has a bottom-growing-up configuration.

4. The method of claim 2, wherein the transmitting step comprises:
    transmitting a reverse delimited read command, when the tag memory has a top-growing-down configuration.

5. The method of claim 1, wherein the transmitting step comprises:
    Transmitting a maximum read length limit, wherein the delimited read command causes an RFID tag to cease reading data stored in tag memory when the limit has been reached.

6. The method of claim 5, further comprising:
    adjusting the limit based on the statistics of prior communications.

7. The method of claim 1, wherein the transmitting step comprises:
    transmitting a specified delimiter pattern for the tag to detect.

8. A method for retrieving data from an RFID tag memory by an RFID tag, comprising:

receiving a delimited read command including a memory start address location, wherein the delimited read command comprises one of a Gen-2 optional command and a Gen-2 custom command;

reading data starting from the memory start address location in the read direction;

terminating the read process by the RFID tag when one of a delimiter pattern is detected in the data being read or a maximum amount of data has been read based on at least one parameter in the delimited read command; and transmitting the read data that excludes a portion of the data in the tag memory stored subsequent to the delimiter pattern.

9. The method of claim 8, further comprising after the terminating step:

determining if the delimiter pattern is a false delimiter pattern; and continuing the read process if the detected delimiter pattern is a false delimiter pattern.

10. The method of claim 9, wherein the determining step further comprises:

determining whether the delimiter pattern occurs at a location where a valid data item is expected; and marking the delimiter pattern as false when the delimiter pattern occurs at a valid data location.

11. The method of claim 8, further comprising:

continuing the read process if the detected delimiter pattern occurs within a locked block of memory.

12. A data structure embodied in a computer readable medium for optimized access of data items in a memory of a radio frequency identification tag by a reader that transmits a delimited read command, the data structure comprising:

a sequence of data objects encoded to prevent a false delimiter pattern within the sequence; and a delimiter pattern following the sequence of data objects, wherein the delimiter pattern indicates an end of data stored in the tag memory thereby causing the tag to affirmatively stop reading data in the tag memory in response to the delimited read command and to provide read out data based thereon that excludes any data objects stored in the computer readable medium subsequent to the delimiter pattern, wherein the delimited read command comprises one of a Gen-2 optional command and a Gen-2 custom command.

13. The data structure of claim 12, wherein the data is formatted using packed object format.

14. The data structure of claim 12, wherein the delimiter pattern is a zero-valued zero byte.

15. The data structure of claim 12, wherein the delimiter pattern is an arbitrary sequence of one and zero bits.

16. A method for writing data to a radio frequency identification tag to allow for efficient access to the data by a reader, comprising:

receiving a set of data objects to be written to a tag memory;

encoding the set of data objects according to a predefined format;

adding a delimiter pattern at the end of the encoded data to form a data sequence to be written to the tag memory, the delimiter pattern causing the tag to affirmatively stop reading data in the tag memory in response to a delimited read command and to provide read out data based thereon that excludes any data objects stored in the tag memory subsequent to the delimiter pattern, wherein the delimited read command comprises one of a Gen-2 optional command and a Gen-2 custom command; and writing the data sequence to the tag memory.

17. The method of claim 16, further comprising:

determining whether the encoded set of data objects includes a pattern within a data object which is identical to the delimiter pattern; and altering the pattern within the data object in a predetermined manner if the pattern is identical to the delimiter pattern.

18. The method of claim 16, further comprising:

determining whether the delimiter pattern occurs within a block to be locked; and adding padding to the set of data objects such that the delimiter pattern occurs at the start of the following block.

19. The method of claim 1, wherein a type of the delimiter pattern comprises one of a predetermined custom pattern or a predetermined default pattern.

20. The method of claim 19, further comprising:

prior to the transmitting step, determining a configuration of the RFID tag comprising the type of the delimiter pattern; and if the type is the predetermined custom pattern, providing the predetermined custom pattern as an additional parameter in the delimited read command.

* * * * *